United States Patent [19]

Brown

[11] 4,373,062

[45] Feb. 8, 1983

[54] PHENOL-RESORCINOL-FORMALDEHYDE RESIN

[76] Inventor: Gordon E. Brown, 1960 W. 25th, Eugene, Oreg. 97405

[21] Appl. No.: 255,545

[22] Filed: Apr. 20, 1981

[51] Int. Cl.³ ............................................. C08L 61/14
[52] U.S. Cl. ................................... 524/841; 524/596; 525/501; 528/147; 528/155
[58] Field of Search ................ 528/155, 147; 525/501; 260/29.3; 524/841, 596

[56] References Cited

U.S. PATENT DOCUMENTS 2,614,096 10/1952 Spahr .................................... 528/147
3,428,593 2/1969 Higginbottom et al. ........... 528/147

*Primary Examiner*—Theodore E. Pertilla
*Attorney, Agent, or Firm*—Klarquist, Sparkman, Campbell, Leigh, Whinston & Dellett

[57] ABSTRACT

Phenol-formaldehyde and phenol-resorcinol-formaldehyde resinous aqueous syrups useful as thermosetting binders or adhesives are prepared by reacting, a phenol-formaldehyde resin composition firstly at atmospheric reflux temperature at a substantially neutral pH of 5.8 to 8.5 and a formaldehyde to phenol mol ratio between 1.7 to 2.8 for a period of 20 to 120 minutes; reacting secondly with added formaldehyde, if necessary, and also needed alkali metal hydroxide to produce mol ratios of 2.1 to 2.8 and 0.10 to 0.38, respectively, per mol of phenol, for a period of at least two minutes at reflux to produce a liquid phenol-formaldehyde thermosetting resin. The setting time can be decreased, if desired, by using two portions of syrup, reacting one portion for a greater time-temperature period than the other and combining the two portions. By scavenging the remaining free formaldehyde by addition of a suitable reactant and then adding resorcinol and proceeding with a time-temperature period of copolymerization until the desired viscosity, water dilution tolerance, and potential setting speed upon formaldehyde addition are attained, a phenol-resorcinol-formaldehyde resin is obtained. The liquid resinous product is storable and is useful as an adhesive when activated by the addition of monomeric or polymeric formaldehyde to form a hard solid.

9 Claims, No Drawings

PHENOL-RESORCINOL-FORMALDEHYDE RESIN

BACKGROUND OF THE INVENTION

As presently manufactured and used, phenol-resorcinol-formaldehyde adhesives constitute a compromise between the desirable high reactivity but undesirable high cost of resorcinol, and the desirable cost but undesirable lower reactivity of phenol.

Resorcinol-formaldehyde resins are made with a stoichiometric deficiency of formaldehyde, e.g. 0.7 mols per mol of resorcinol, and are quite storage-stable, being activated for use by adding formaldehyde to a ratio of 1 or more, whereupon gelation occurs cold.

Phenol-formaldehyde resins, by contrast, are made with a full complement of formaldehyde of 1.4 to 2.7 mols per mol phenol, have a commercially acceptable limitation of storage life, and are activated to set by heat in use operations typically characterized as hotpressing operations.

These disparate modes of storage and use of resorcinol-formaldehyde and phenol-resorcinol resins bring about several dilemmas when one seeks compromise intermediate storage life, cost, and setting speed in use in a phenol-resorcinol-formaldehyde combination. Generally, speaking, if phenol and resorcinol were both present in a formaldehyde reaction mixture, virtually no phenol would react before the resorcinol depleted the formaldehyde or gelled.

Therefore, it is usual commercial practice to first react phenol and formaldehyde to a polymer size resulting in a syrup of substantially increased viscosity, before charging the resorcinol late in the heated condensation period. The phenol-formaldehyde reaction is carried out with alkaline catalysis at a pH substantially greater than 8.5, but catalyst content is carefully limited because of deleterious effects of alkali on storage stability and adhesive durability. The formaldehyde ratio to phenol is held quite low because of severe effects on storage life when the resorcinol is added. The result is a poor utilization of the phenol present so that commercial phenol-resorcinol-formaldehye resins often have a strong characteristic odor of unreacted phenol.

SUMMARY OF THE INVENTION

The superior performance of the resin of my invention can be explained by a new understanding of the chemistry of phenol-formaldehye resins. Conventional practice divides phenolic resins into acid catalyzed and base catalyzed types. On one hand, acid-catalyzed resin binders are known to become faster curing as the pH is lowered; base-catalyzed resin binders are known to be faster curing at a given solids/viscosity level when more alkali metal hydroxide is present.

I have developed data that indicates:

(1) The addition reaction of formaldehye and phenol, called methylolation, is highly catalyzed by high basicity but does occur at all pH's. It is highly exothermic.

(2) The condensation-polymerization reaction joining phenolic rings is highly catalyzed by high acidity but the effect of pH is continuous to some degree in that direction throughout the total pH range.

(3) Polymerization between two phenolic rings activates the available ortho and para-positions on both toward either methylolation or polymerization, so that a dimer is more reactive than a monomer, a trimer than a dimer, etc.

(4) Methylolation of any available ring position of a polymer activates the other ortho and para-positions of all attached rings, toward either methylolation or polymerization. Multiple methylol additions on attached rings mutually activate each other.

(5) It is possible to approach the theoretical saturation ratio of combined formaldehyde to phenol of a low molecular weight phenol-formaldehyde polymer because of this mutual activation. The saturation ratio can be expressed as a function of the number of rings, n:

$$R = 2 + 1/n$$

In contrast, phenol monomer requires an alkali metal hydroxide to phenol mol ratio of 1.0 and an excess of formaldehyde to form the saturated trimethylolphenol.

Postulating these mechanisms can explain the observed alkaline and acid behavior of phenolic resins and remedy the oversimplification implicit in acid- and base-catalyzation, to wit:

1-In the case of acid-reacted resins, methylolation proceeds at first to some slight extent, followed promptly by acid-catalyzed condensation linking and thus enhanced reactivity toward further methylolation, even at acid pH. This allows the acid-catalyzed polymerization to govern the total reaction sequence. It follows that this mechanism results in a differentiation of polymer size since the larger molecules are more reactive to become even bigger. This view is consistent with the commercial practice of stripping out considerable quantities of unreacted phenol after preparation of an acid-reacted resin.

2-In the case of base-reacted resin, several factors obfuscate the fact that polymerization is not directly catalyzed by alkali at all:

a-Methylolation is catalyzed by alkali and methylolation catalyzes polymerization.

b-A differentiation of polymer size in the reaction mixture is brought about because of the relative enhanced reactivity of the larger molecules, and their rapid methylol saturation at the expense of smaller molecules. Speed of gelation in use is disproportionately increased by the portion of polymer syrup present as large molecules.

c-The above mentioned large molecules are susceptible to hydrogen bonding, causing unmanageable high viscosity unless the bonds are broken by the presence of alkali. This is shown by the marked lowering of viscosity of an alkaline-prepared syrup by the addition of more alkali.

d-Alkaline syrups are often used where they are dispersed on or into wood, whose acids neutralize some alkali and raise viscosity in situ.

Thus, setting speed has been viewed to vary directly with alkali level.

My invention produces first a phenol-formaldehyde resin distinctly different from either acid- or base-prepared resins, allowing several objectives to be attained.

1-A narrow range of polymer molecular size is first produced in an initial reaction product in which the polymer molecules are relatively small and uniform in size. Uniformity in size tends to persist in subsequent reactions.

2-A maximized ratio of total combined formaldehyde to phenol is brought about.

3-Copolymerization of resorcinol with the phenol-formaldehyde polymer is enhanced by the maximized ratio of point 2 above and also the absence of large sized polymer molecules in the polymer enables the use of a greater copolymerization time/temperature period before the syrup undergoes unacceptable viscosity increase.

4-The reactivity of the copolymer product when activated with formaldehyde at time of use is enhanced by the saturation of the phenolic base with methylol groups.

5-The relative uniformity of polymer molecular size and reactivity produce a high strength solid quickly at the time of gelation.

That these objectives are substantially attained in the resin of my invention is evidenced by the following observations:

When my resin is compared to a base-reacted resin, both adjusted to an identical raw material composition and viscosity, the base-reacted resin at an alkali hydroxide mol ratio of 0.22–0.3 per mol phenol will be water miscible while my resin has a hydrophobe point on dilution with water.

Further, when additional alkali is added to the base-reacted resin, the viscosity is markedly reduced, while the viscosity of my resin will increase or remain about unchanged.

Conventional base-reacted resins do not normally exhibit a mol ratio of combined formaldehyde to phenol greater than 2.05. This is because of the great range of polymer molecular weight. The monomeric phenol saturates with methylol addition groups only with great difficulty and with large amounts of alkali, while the large polymeric molecules approach the maximum saturation ratio of 2.0 with increasing size. The mathematical expression for formaldehyde:phenol ratio of a polymer of n rings at saturation is $R = 2 + 1/n$.

Conventional acid-reacted phenol-formaldehyde resins show combined formaldehyde:phenol ratios considerably below 2.0.

The phenol-formaldehyde resin of my invention can be and preferably is reacted to a combined formaldehyde:phenol ratio of about 2.3:1. This corresponds with a number average molecular weight of $3\frac{1}{3}$ phenolic rings, at which point the combined formaldehyde ratio begins to drop with further polymerization.

The phenol-formaldehyde resin just described is stable at ambient temperatures and can be employed as an improved thermoset resin for conventional purposes using conventional procedures. Because of the comparative absence of large polymer molecules, it has a longer setting time than most conventional phenol-formaldehyde resins and the uniformity of polymer molecule size provides a very hard product when set.

Resorcinol can be added to the phenol-formaldehyde resin to produce a stable phenol-resorcinol-formaldehyde resin in liquid form which will set to a hard solid at usual room temperatures upon mixing with formaldehyde. The amount of resorcinol will usually be between 60 to 140% of the phenol.

After resorcinol is dissolved in the phenol-formaldehyde resin of my invention, it can be and preferably is reacted at an extended time/temperature period to effect copolymerization. By contrast, an identical composition at identical viscosity, but where the phenol and formaldehyde had been reacted in the presence of alkali, will advance quickly to the maximum useable viscosity without the several manifestations of copolymerization of my resins.

a-Water dilutability improves during copolymerization, changing from a syrup that will hydrophobe with a small amount of water, gradually, to a water-miscible one. In contrast, a phenol-resorcinol-formaldehyde syrup made from base catalyzed phenol-formaldehyde typically becomes more hydrophobic with advancement in storage.

b-The time period to gellation when my copolymer system is mixed with formaldehyde progressively shortens during the copolymerization period.

c-The hardness of the solid that will result from adding the triggering formaldehyde increases progressively during the copolymerization time/temperature period.

Among the advantages of my phenol-resorcinol-formaldehyde resin over those used in typical commercial laminating adhesives are:

1-Absence of free phenol with attendant respiratory and skin contact problems in use.

2-Enhanced and controllable speed of cure.

3-Stronger final solid gel.

4-Effectiveness of costly resorcinol at significantly lower proportions.

5-Water compatibility and improved washability from the applying equipment.

It is an express purpose of my process to produce first a phenol-formaldehyde polymer of relatively uniform molecular size in order to maximize methylolation and then copolymerization with resorcinol. Even when my phenolic resin is polymerized further in the presence of alkali it remains much slower curing than a resin of identical viscosity/composition but reacted alkaline, because my resin remains relatively uniform in molecular size.

It is possible to differentiate the molecular size and greatly increase curing speed of my resin by the expedient of dividing it into two portions for the alkaline polymerization period, reacting one portion for a greater time/temperature period than the other, and recombining. Handling difficulties due to high viscosity can be alleviated by using disproportionately high amounts of alkali and water with the portion of greater reaction time, within the composition limitations of the recombined composite.

To be effective in producing a phenol-formaldehyde resin competitive in speed to base reacted resins of like composition, this differentiation should be carried to at least a fourfold difference in viscosity between two portions when the more concentrated resin is diluted to the same phenol content as the other.

This technique of differentiating molecular size of my phenol-formaldehyde precursor has a profound effect to speed the final setting time when actuated by formaldehyde of my phenol-resorcinol-formaldehyde resin, and is consequently a valuable control tool. Differentiation promotes attachment of the resorcinol to the large phenolic molecules and brings about a fast final setting time, but at an abbreviated time-temperature period during which copolymerization with resorcinol can occur. It is therefore of value to produce and control the setting speeds that may be desired. Thus the resulting setting speed can be controlled by varying the proportions of the two portions and the extent of reaction of the reacted portion.

DETAILED DESCRIPTION OF THE PREFERRED EMBODIMENT

Preparation of the phenol-resorcinol resin of my invention is done in four stages. Mixing the resin with formaldehyde to initiate final gelation can be considered the fifth stage.

First, phenol and formaldehyde in solution in water are reacted at a pH of 5.8 to 8.5 and a mol ratio of formaldehyde to phenol of 1.7–2.8:1 for a substantial time-temperature period. This is best done at as high a concentration of reactants as is readily available, and at atmospheric reflux. It is recognized that reaction rates roughly double with each 10° C. rise in temperature, so any period specified can usually be duplicated at lower temperatures and longer times, if the time-temperature period employed produces the required extent of reaction. Completion of stage one is signified by the disappearance of sufficient free formaldehyde content to leave a combined mol ratio of formaldehyde to phenol of about 2.0:1, and the appearance and progressive increase of hydrophobicity when diluted with water.

Stage two is conducted with formaldehyde-phenol mol ratio adjusted to 2.0–2.8:1 if not already in that range, and with alkali metal hydroxide added to a mol ratio of 0.10–0.38:1 based on phenol. Caution: methylolation reaction can now be very exothermic. After a reflux period of 4–8 minutes, temperature is lowered and free formaldehyde content determined at intervals. One endpoint of stage two that may be desirable is the time at which the combined formaldehyde to phenol mol ratio passes a maximum and begins to diminish, since this represents the maximum potential for copolymerization with resorcinol, hence a stronger final gelled solid. A further reaction period, preferably the two portion procedure described above, to accomplish differentiation of molecular size and giving a different stage two endpoint is necessary if the attainment of faster final setting speed is desired.

Stage three consists of reacting the syrup with a suitable formaldehyde scavenger such as ammonia in an amount adequate to react with substantially all the free formaldehyde. Free formaldehyde determinations can monitor the completion of stage three.

Stage four is an extended time-temperature period with resorcinol dissolved in the aqueous syrup, wherein resorcinol adds to the phenol-formaldehyde polymer by reacting with the methylol groups attached. The stage is completed when the desired viscosity/percent solids, water dilutability and reactivity upon activation with added formaldehyde are reached.

Stopping the above procedure after stage two produces the improved phenol-formaldehyde of my invention.

EXAMPLE I

An aqueous phenol-resorcinol-formaldehyde resin syrup was prepared by first reacting for 35 minutes at atmospheric reflux, one gram-mol of phenol, 94 grams, 2.5 gram-mols of 47% formalin, 160 grams, and 0.02 gram-mols of 50% sodium hydroxide, 1.6 grams. The pH was about 7.3. At the end of this period the syrup showed a hydrophobe haze with a 2:1 dilution with 25° C. water, and a free formaldehyde content indicating, by difference, 1.8 mols of formaldehyde combined per mol phenol. Another 0.16 gram-mols of 50% sodium hydroxide, 12.8 grams, was added and the mixture was held at reflux for 20 minutes. The hydrophobe point was measured at 10:1 and free formaldehyde indicated 2.34 mols of formaldehyde combined per mol phenol. Another 40 minutes at 80° C. yielded 2.28, 18 hours additional at 50° C. gave 2.27, and yet another 7 hours at 50° C. gave 2.24. The phobe point meanwhile had disappeared and the resin was miscible. It was diluted with water to 25.5% phenol, at which dilution the free formaldehyde was 2.16%. 28% ammonia was added to the stoichiometric equivalent of the formaldehyde in producing hexamethylene tetramine, or 2.5%. After 24 hours standing, resorcinol was added to the extent of 90% by weight of the phenol content, and hydrophobe haze was measured at 3:1 dilution with 25° C. water. The system was held 26 hours at 50° C., at which time it was observed to be completely miscible with 25° C. water.

The syrup, now containing 18.3% resorcinol and 20.3% phenol, gelled in 105 minutes when mixed at 22° C. with 15% of 47% formalin. The gel was glass hard in 16 hours.

After aging 7 days at room temperature, the syrup gelled in 78 minutes at 22° C. with 15% of 47% formalin.

EXAMPLE II

An aqueous phenol-resorcinol-formaldehyde resin syrup was prepared by first reacting at atmospheric reflux one gram-mol of phenol, 94 grams, 2.5 gram-mols of 47% formalin, 160 grams, and 0.015 gram-mols of 10% sodium hydroxide, 6 grams. The pH was determined to be about 6.5. After 30 minutes of reflux, a sample exhibited a hydrophobe when mixed with 25° C. water and contained free formaldehyde to the extent indicating 1.87 mols had combined per mol phenol. At 90 minutes reflux the mixture was cooled and tested for formaldehyde which indicated 2.05 mols had combined. A sample held at 50° C. for 20 hours hydrophobed without the addition of water when cooled to 27° C.

0.14 gram-mols of 50% sodium hydroxide, 11.2 grams (adjusted for loss to sampling) was added and the mixture was held 20 hours at 50° C. Hydrophobe with 25° C. water occurred at a mix of 2.4 water to 1 resin by weight, and a free formaldehyde determination indicated the combination of 2.18 mols per mol phenol. Aqueous ammonia, 28%, was added to the mixture in a stoichiometric amount, 4.8%, to produce hexamethylene tetramine of the 3.6% free formaldehyde, and the mix was stored at room temperature for 3 hours.

Resorcinol was dissolved in the liquid in the amount of 15/17 of the phenol content. This liquid clotted with 4 parts water per 1 part liquid. The mix now contained 22.8% resorcinol and 25.8% phenol. A sample of liquid with freshly dissolved resorcinol was mixed with 47% formalin to the extent of 1.6 mols per resorcinol, or 21.2%. The mix gelled at 25° C. in 120 minutes.

The batch was now held at 50° C. for 24 hours, was then diluted with water to a resorcinol content of 15% and a phenol content of 17%, and was held at 50° C. for an additional 22½ hours.

The now copolymerized resin exhibited a slight haze when diluted with 12 parts water per 1 of resin. When it was mixed with 47% formalin at the rate of 1.6 mols per mol of resorcinol content, gellation occurred in 7 minutes at 25° C., and the gel quickly became very hard.

EXAMPLE III

An aqueous phenol-formaldehyde resin syrup was prepared by first reacting at atmospheric reflux one gram-mol of phenol, 94 grams, 2.4 gram-mols of 47% formalin, 153.2 grams, and 0.015 gram-mols of 10% sodium hydroxide, 6 grams. The pH was determined to be 6.8. After 75 minutes at reflux the batch was cooled to 65° C. and 0.235 gram-mols of 50% sodium hydroxide, 18.8 grams, was charged. Temperature rose to 70° C. and after 10 minutes the batch was cooled. The free formaldehyde content indicated by difference that 2.076 mols of formaldehyde had combined. The batch was then held at 50° C. for 20 hours, at which time combined formaldehyde was read at 2.281.

The batch was divided into two equal portions designated A and B, and A was set aside. B was further reacted for 80 minutes at 77° C. plus 79 hours at 49° C., during which time batch B was diluted with water from the original 34.8% phenol to 19.5% phenol in order to maintain handleable viscosity. Viscosity nonetheless rose to 680 cps and the indicated ratio of mols combined formaldehyde per mol phenol fell to 2.130 progressively with reaction time. Portions A and B were recombined on an equal phenol basis, 36% A and 64% B, to result in the intended 25% phenol product. Although at the time of mixing, portion A was at viscosity 270 cps and B was at 680 cps, the blend had only a viscosity of 210 cps. The blended syrup was found to be an effective and efficient particleboard binder when tested at the fastest commonly attained press times for phenolic resin binder.

EXAMPLE IV

An aqueous phenol-formaldehyde resin syrup was first prepared by reacting at atmospheric reflux one gram-mol of phenol, 94 grams, 2.1 gram-mols of 47% formalin, 134 grams, and 0.015 gram-mols of 10% sodium hydroxide, 6 grams, for 75 minutes. When cooled this resin syrup had a viscosity of about 60 cps at 25° C. and a free formaldehyde content indicating a mol ratio of combined formaldehyde to phenol of 1.926 to 1. A portion was designated A and was set aside; an equal portion designated B was adjusted with caustic and formalin additions to a mol ratio of 2.7 formaldehyde and 0.485 sodium hydroxide per mol phenol. B was heated to reflux for 8 minutes and cooled and during the cooling period was diluted with water to such an extent that when A and B were mixed together on an equal phenol basis, the phenol content was 25% of the whole. The recombined mixture was designated C and had a formaldehyde mol ratio of 2.4 and a sodium hydroxide mol ratio of 0.25 based on one mol of phenol. The viscosity of B at time of mixing was 300 cps, and although the viscosity of A was only 90 cps, the viscosity of the mixture was also 300 cps due largely to the averaging down of the sodium hydroxide:phenol mol ratio of syrup B.

Mixture C was now treated with ammonia hydroxide to scavenge the free formaldehyde and was held overnight at room temperature to allow completion of the reaction. Resorcinol was added in an amount equal to the phenol content, weight basis, and the syrup was reacted 32 hours at 50° C. When diluted with water to 12.5% phenol, 12.5% resorcinol, the syrup had a viscosity of 300 cps. A sample was mixed with 13% of 47% formalin at room temperature and the mix gelled in 25 seconds. However during gelation the mix hydrophobed badly and the solid was weak and crumbly due to discontinuity of the two phases. The same resin was treated with ½% of 50% sodium hydroxide, and the addition of 13% of 47% formalin now resulted in a shiny, hard, single phase gel, also in 25 seconds. The hydrophobicity indicates that the resorcinol has not copolymerized extensively but rather selectively with the disproportionately large phenolic chains to produce inordinately fast setting times. The hard, single-phase gel was observed to remain considerably weaker than the gel of Example II.

It is highly probable that setting speeds of this order are too high for most commercial application because of process handling limitations, but this example illustrates the wide range of setting speed control that is possible with the phenol-resorcinol-formaldehyde resin of my invention.

I claim:

1. The process of preparing an aqueous syrup containing reacted phenol and formaldehyde, and capable of reacting further to provide a hard solid, which process comprises:
    reacting an aqueous mixture of phenol and formaldehyde containing a mol ratio of formaldehyde to phenol between 1.7 and 2.8 at a pH of 5.8 to 8.5 for a time-temperature period causing a phenol-formaldehyde polymer to be formed as signified by the appearance of a hydrophobe point upon dilution with water;
    adjusting the total formaldehyde to phenol mol ratio to a ratio within the range of 2.1 and 2.8 to 1 if the total ratio is not already within said range and adding alkali metal hydroxide to provide a total mol ratio of alkali metal hydroxide to phenol between 0.10 and 0.38 to 1 and reacting the resulting mixture for a time-temperature period producing a maximum amount of combined formaldehyde to provide an aqueous syrup product which is heat curable to a hard solid.

2. The process of claim 1 which also includes:
    reacting the heat curable product with a formaldehyde scavenger in an amount approximately stoichiometric to the free formaldehyde content of the heat curable product; and
    adding resorcinol in an amount between 60 and 140% of the phenol and reacting the resulting mixture for a time-temperature period effecting copolymerization producing a stable phenol-resorcinol-formaldehyde liquid resin product which will set to a hard solid upon admixture with additional formaldehyde.

3. The process of claim 1 which also includes:
    further reacting a portion of the heat curable phenol-formaldehyde aqueous syrup product;
    and combining the resulting further reacted portion with another portion of the heat curable phenol-formaldehyde aqueous syrup product to provide a heat curable aqueous syrup product having a decreased setting time.

4. The process of claim 2 which also includes:
    further reacting a portion of the heat curable aqueous syrup; and
    combining the further reacted portion with another portion of heat curable aqueous syrup and scavenging the two portions with a formaldehyde scavenger prior to adding the resorcinol to decrease the setting time of the phenol-resorcinol-formaldehyde liquid resin upon admixture of additional formaldehyde.

5. The process of preparing an aqueous syrup containing a copolymer of phenol, formaldehyde and resorcinol and capable of further reacting with added formaldehyde to provide a hard solid;

which process comprises reacting an aqueous mixture of phenol and formaldehyde containing a mol ratio of formaldehyde to phenol of 1.7 to 2.8:1 and containing a pH active agent producing a pH between 5.8 and 8.5 until a phenol-formaldehyde polymer is formed;

adjusting the total formaldehyde to phenol ratio to a ratio within the range of 2.1 to 2.8:1 if the total ratio is not already within said range and adding alkali metal hydroxide to a mol ratio between 0.10 and 0.38 per mol of phenol and reacting the resulting mixture at an elevated temperature at least until the mol ratio of combined formaldehyde to phenol reaches a maximum and begins to decline, to obtain a polymer in which the molecules are relatively uniform in molecular size and have nearly all the available reactive positions of the phenol groups therein occupied by methylol groups;

reacting the polymer mixture with sufficient formaldehyde scavenger to substantially remove free formaldehyde;

adding resorcinol to the polymer mixture and reacting at an elevated temperature to cause condensation with the methylol groups to form methylene bridges between resorcinol and the phenolic chains and continuing the reaction period until the desired syrup viscosity and syrup reaction speed with added formaldehyde are attained.

6. The process of preparing an aqueous syrup containing a copolymer of phenol, formaldehyde, and resorcinol and capable of reacting further with added formaldehyde to provide a hard solid;

which process comprises reacting an aqueous mixture of phenol and formaldehyde containing a mol ratio of formaldehyde to phenol between 1.7 and 2.8 and a pH-active material in an amount producing a pH between 5.8 and 8.5 at least until a phenol-formaldehyde polymer is formed as signified by the appearance of a hydrophobe point upon water dilution;

adding formaldehyde if necessary to provide a mol ratio of formaldehyde to phenol of 2.1–2.8 to 1, and adding alkali metal hydroxide to produce a mol ratio of the alkali metal hydroxide to phenol of 0.10–0.38 to 1; reacting this mixture for a time-temperature period until the amount of formaldehyde that has combined reaches substantially a maximum as indicated by free formaldehyde content;

obtaining two portions of the resulting mixture and reacting further one portion to a greater extent than the other;

combining the portions and mixing with a formaldehyde scavenger in approximate stoichiometric amount to the free formaldehyde content; and adding resorcinol and reacting for a time-temperature period to effect copolymerization, to a period endpoint that corresponds to the attainment of the desired gelling speed upon adding formaldehyde.

7. The process of preparing an aqueous syrup containing a copolymer of phenol, formaldehyde, and resorcinol and capable of reacting further with added formaldehyde to provide a hard solid;

which process comprises reacting an aqueous mixture of phenol and formaldehyde containing a mol ratio of formaldehyde to phenol between 1.7 and 2.8 and a pH-active material in an amount producing a pH between 5.8 and 8.5, at least until a phenol-formaldehyde polymer is formed as signified by the appearance of a hydrophobe point upon water dilution;

adding formaldehyde if required to provide a mol ratio of formaldehyde to phenol of 2.1–2.8 to 1, and adding alkali metal hydroxide to produce a mol ratio of alkali metal hydroxide to phenol of 0.10–0.38 to 1, reacting this mixture for a time-temperature period until the amount of formaldehyde that has combined reaches substantially a maximum as indicated by free formaldehyde content;

obtaining two portions of the resulting mixture and reacting further one portion to a greater extent than the other;

mixing each portion with a formaldehyde scavenger in an amount approximately stoichiometric to the free formaldehyde content;

adding resorcinol to the least-reacted portion and reacting to effect copolymerization and combining such portion with the other portion and bringing total copolymerization reaction time to an endpoint corresponding to a desired setting speed with added formaldehyde.

8. The process of preparing a phenol-formaldehyde aqueous syrup;

which process comprises reacting an aqueous mixture of phenol and formaldehyde containing a mol ratio of formaldehyde to phenol between 1.7 and 2.8 at a pH of 5.8 to 8.5 until a phenol-formaldehyde polymer is formed as signified by the appearance of a hydrophobe point upon water dilution;

adding formaldehyde if required to provide a mol ratio of formaldehyde to phenol of 2.1–2.8 to 1, and adding alkali metal hydroxide to provide a mol ratio of alkali metal hydroxide to phenol of 0.10–0.38 to 1, reacting this mixture for a time-temperature period until the amount of formaldehyde that has combined reaches a maximum;

obtaining two portions of the resulting mixture and reacting further one portion to a greater extent than the other, further reacting the two portions differentially until the portions exhibit a viscosity difference at least fourfold when brought by water dilution to the same phenol concentration;

and combining the portions as a phenol-formaldehyde resin syrup binder.

9. The process of claim 8 which also includes diluting the one portion to a greater extent than the other portion before further reacting said one portion.

* * * * *